US009131373B2

(12) United States Patent
Patil et al.

(10) Patent No.: US 9,131,373 B2
(45) Date of Patent: Sep. 8, 2015

(54) DYNAMIC ACCOUNT CREATION WITH SECURED HOTSPOT NETWORK

(75) Inventors: Basavaraj Patil, Coppell, TX (US); Gabor Bajko, Sunnyvale, CA (US)

(73) Assignee: Nokia Technologies Oy, Espoo (FI)

( * ) Notice: Subject to any disclaimer, the term of this patent is extended or adjusted under 35 U.S.C. 154(b) by 549 days.

(21) Appl. No.: 13/234,906

(22) Filed: Sep. 16, 2011

(65) Prior Publication Data

US 2012/0072976 A1 Mar. 22, 2012

Related U.S. Application Data

(60) Provisional application No. 61/383,475, filed on Sep. 16, 2010.

(51) Int. Cl.
*G06F 7/04* (2006.01)
*G06F 15/16* (2006.01)
*G06F 17/30* (2006.01)
*H04L 29/06* (2006.01)
*H04W 12/06* (2009.01)

(52) U.S. Cl.
CPC .............. *H04W 12/06* (2013.01); *H04L 63/162* (2013.01); *H04L 63/164* (2013.01); *H04L 63/166* (2013.01)

(58) Field of Classification Search
CPC ............................... H04L 63/12; H04W 12/06
USPC ............................................................ 726/6
See application file for complete search history.

(56) References Cited

U.S. PATENT DOCUMENTS

| | | | | |
|---|---|---|---|---|
| 7,444,511 | B2 * | 10/2008 | Morimoto | 713/168 |
| 8,341,717 | B1 * | 12/2012 | Delker et al. | 726/10 |
| 2007/0157024 | A1 * | 7/2007 | Miller | 713/168 |
| 2007/0206527 | A1 * | 9/2007 | Lo et al. | 370/328 |
| 2010/0192212 | A1 * | 7/2010 | Raleigh | 726/7 |

FOREIGN PATENT DOCUMENTS

| | | |
|---|---|---|
| EP | 1 615 381 A1 | 1/2006 |
| WO | WO 03/096554 A2 | 11/2003 |

OTHER PUBLICATIONS

Janise McNair; Vertical Handoffs in Fourth-Generation Multinetwork Environments; Jun. 2004; IEEE; pp. 1-8.*
Ott, et al, "Towards Automated Authentication for Mobile Users in WLAN Hot-Spots", (2005), (pp. 1232-1241).
IEEE Std 802.1X-2001, "IEEE Standard for Local and Metropolitan Area Networks—Port Based Network Access Control", (Jun. 2001), (134 pages).
IEEE Std 801.1X-2004, 802.1X, "IEEE Standard for Local and Metropolitan Area Networks Port Based Network Access Control", (Dec. 13, 2004), (169 pages).

* cited by examiner

*Primary Examiner* — Monjour Rahim
(74) *Attorney, Agent, or Firm* — Harrington & Smith (57) ABSTRACT

A secure network access point transmits a beacon transmission. A user device receiving it determines it does not have credentials necessary to attach with the secure network access point, and so a preliminary association is formed between the user device and the secure network access point. During the preliminary association, the user device receives or creates credentials necessary to associate with the secure network access point, forms an association with the secure network access point using the received or created credentials, and obtains internet connectivity via the secure network access point. In this embodiment there is only the secure network access point, but in another embodiment there is also a non-secure network access point which transmits a beacon using the same SSID as the secure network access point, and the preliminary association is with the non-secure network access point.

20 Claims, 6 Drawing Sheets

DYNAMIC ACCOUNT CREATION WITH SECURED HOTSPOT NETWORK

CROSS REFERENCE TO RELATED APPLICATION

This application claims priority under 35 USC 119(e) to Provisional U.S. Patent application Ser. No. 61/383,475, filed on Sep. 16, 2010. That priority application is hereby incorporated by reference in its entirety.

TECHNICAL FIELD

The exemplary and non-limiting embodiments of this invention relate generally to wireless communication systems, methods, devices and computer programs and, more specifically, relate to wifi hotspot networks and the ability to authenticate with service providers who operate such networks.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Wi-Fi is a Trademark of the Wi-Fi Alliance and is associated with various products that belong to a class of wireless local area network (WLAN) devices based on the IEEE 802.11 standards. The term Wi-Fi is often found to be used as a synonym for IEEE 802.11 technology.

Public Wi-Fi hotspot networks are widely deployed today in many environments such as hotels, restaurants, coffee shops, airports, malls and public/private offices. Internet access through these hotspot networks requires a user to either have a subscription with the operator of that hotspot network or some type of roaming arrangement.

Currently there is an industry forum effort ongoing referred to as Hotspot 2.0 which aims to simplify the process of accessing public Wi-Fi hotspot networks.

There are currently two main types of Wi-Fi network public deployments:
  open networks, where the device can freely associate to the network, but does not obtain Internet access until it launches a browser and provides credentials; and
  RSN enabled networks, which require credentials to associate. Robust Security Network (RSN) is an element of IEEE 802.11i authentication and encryption algorithms to be used for communications between wireless access points (WAPs) and wireless clients.

The open public Wi-Fi hotspot networks that are currently deployed are generally operated by ISPs (Internet Service Providers), cellular operators, or by a business establishment itself. These networks typically require a paid subscription or they can be offered as part of a cellular data plan or purchase of access for a specific duration of time. Such Wi-Fi hotspot networks typically use a technology referred to as captive portals through which the users can provide their credentials to access the network or to purchase access. The captive portal-based approach requires the user to launch a web browser which is then redirected to a portal that is managed by the operator of the hotspot network. This portal provides information about the various data plans that can be purchased. If the user has a subscription with the operator, the portal provides a way for the user to enter assigned credentials and then obtain Internet access. The user device does not have connectivity to the Internet (beyond the captive portal) until authentication is performed. The Wi-Fi hotspot allows the user device to associate with the WiFi access point (AP) and assigns the device an IP address. However the connectivity to the Internet beyond the captive portal is blocked until the user has authenticated using credentials that are assigned as part of a subscription, or the user buys access for a period of time. This approach is currently widely deployed and operates well given the types of applications and services used.

In RSN-enabled hotspot networks the captive portal redirect approach is not possible to be used, since RSN enabled networks require the device to authenticate using 802.1x, and the authentication is performed prior to the device being assigned an IP address. Hence there is no way for the device to be redirected to a portal page. If the device does not have the necessary credentials and ability to authenticate using the 802.1x protocol, then the device is unable to use the Wi-Fi hotspot network. 802.1x is a security protocol specified by IEEE for Extensible Authentication Protocol (EAP) authentication (802.1X™, IEEE Standard for Local and metropolitan networks, Port-Based Network Access Control, 13 Dec. 2004, incorporated by reference herein).

In general, using 802.1x for authenticating with an RSN enabled Wi-Fi hotspot network provides better user experience since the user does not have to open a browser and provide credentials. There is no manual intervention required to obtain Internet connectivity through such a hotspot network.

The 802.1x-based approach works well when the device/user has the credentials that are valid on a Wi-Fi network. However, given the large number of Wi-Fi hotspot operators that operate such networks, the user may not have credentials when roaming or at a given location. It should be possible, even in RSN enabled networks which utilize 802.1x based authentication mechanisms, to provide the user with an opportunity to purchase a subscription. Wi-Fi hotspot network operators can generate revenue by ensuring that they provide service to not only users who have subscriptions but to anyone else who may want to use the network. The hotspot operator can thus have a financial interest in offering the ability to purchase a subscription to access the network.

The Wi-Fi Alliance Hotspot 2.0 working group is currently focused on developing solutions which enable seamless access to HS2.0 Wi-Fi networks by simplifying the access authentication procedures. Providing on-line sign-up capabilities to RSN networks is one topic of discussion.

SUMMARY

In a first exemplary aspect of the exemplary embodiments there is an apparatus comprising at least one processor and at least one memory including computer program code. In this aspect the at least one memory with the computer program code is configured with the at least one processor to cause the apparatus at least to: receive a beacon transmission from a secure network access point; in response to determining that the apparatus does not have credentials necessary to attach with the secure network access point, form a preliminary association with the secure network access point; during the preliminary association, receive or create credentials necessary to associate with the secure network access point; and form an association with the secure network access point using the received or created credentials and obtain internet connectivity via the secure network access point. It is understood from the credentials above that the 'association' by which the apparatus obtains internet connectivity is a secure one.

In a second exemplary aspect of the exemplary embodiments there is a method comprising: receiving at a user device a beacon transmission from a secure network access point; in response to determining that the user device does not have credentials necessary to attach with the secure network access point, forming a preliminary association with the secure network access point; during the preliminary association, the user device receiving or creating credentials necessary to associate with the secure network access point; and forming an association between the user device and the secure network access point using the received or created credentials and obtaining internet connectivity via the secure network access point.

In a third exemplary aspect of the exemplary embodiments there is a non-transitory computer-readable medium that includes computer program instructions. In this aspect, executing the instructions by at least one data processor results in performance of operations comprising: receiving at a user device a beacon transmission from a secure network access point; in response to determining that the user device does not have credentials necessary to attach with the secure network access point, forming a preliminary association with the secure network access point; during the preliminary association, the user device receiving or creating credentials necessary to associate with the secure network access point; and forming an association between the user device and the secure network access point using the received or created credentials and obtaining internet connectivity via the secure network access point.

In a fourth exemplary aspect of the exemplary embodiments there is an apparatus comprising at least one processor and at least one memory including computer program code. In this seventh aspect the at least one memory with the computer program code is configured with the at least one processor to cause the apparatus at least to: transmit a beacon transmission; provide a sign-up network access identifier NAI to a user device while the user device is in a pre-associated state with the apparatus; receive from the user device an association request which includes the sign-up network access identifier NAI; and grant the user device limited access to a network for credential creation purposes.

In an fifth exemplary aspect of the exemplary embodiments there is a method comprising: transmitting at least one beacon transmission; providing a sign-up network access identifier NAI to a user device while the user device is in a pre-associated state; receiving from the user device an association request which includes the sign-up network access identifier NAI; and granting the user device limited access to a network for credential creation purposes.

In a sixth exemplary aspect of the exemplary embodiments there is a non-transitory computer-readable medium that includes computer program instructions. In this aspect, executing the instructions by at least one data processor results in performance of operations comprising: transmitting at least one beacon transmission; providing a sign-up network access identifier NAI to a user device while the user device is in a pre-associated state; receiving from the user device an association request which includes the sign-up network access identifier NAI; and granting the user device limited access to a network for credential creation purposes.

BRIEF DESCRIPTION OF THE DRAWINGS

In the attached Drawing Figures:

FIGS. 5-1 and 5-2 are logic flow diagrams that illustrates from the perspective of the respective open/secure network access points the operation of a method, and a result of execution of computer program instructions embodied on a computer readable memory, in accordance with the exemplary embodiments of this invention.

DETAILED DESCRIPTION

Based on the foregoing discussion it should be appreciated that a problem that exists is that currently there is no method by which a user can purchase a subscription in an RSN enabled network. Simply stated, the user cannot access the network because the user does not have the proper network credentials, and the user cannot create or buy the proper network credentials because the user does not have access to the network. Current practices involve the distribution of a passcode on paper to participants to an event, allowing them to access the network with that passcode (everyone having the same passcode, referred to as WPA_personal in WFA); or generating a separate token for each individual, referred to as WPA-Enterprise by WFA, and use traditional methods of distribution (e.g., email). None of these methods allow for creation of an account on the fly, as they require the potential user to either register to the event, or contact in person an administrator, etc.

The exemplary embodiments of this invention address and solve these and other problems by providing a method for enabling on-line sign-up capabilities for walk-up users to RSN enabled hotspot networks.

The exemplary embodiments of this invention relate at least in part to HS2.0 Wi-Fi networks, and to providing an ability to dynamically create a subscription with an operator of a hotspot network.

Figure 1:
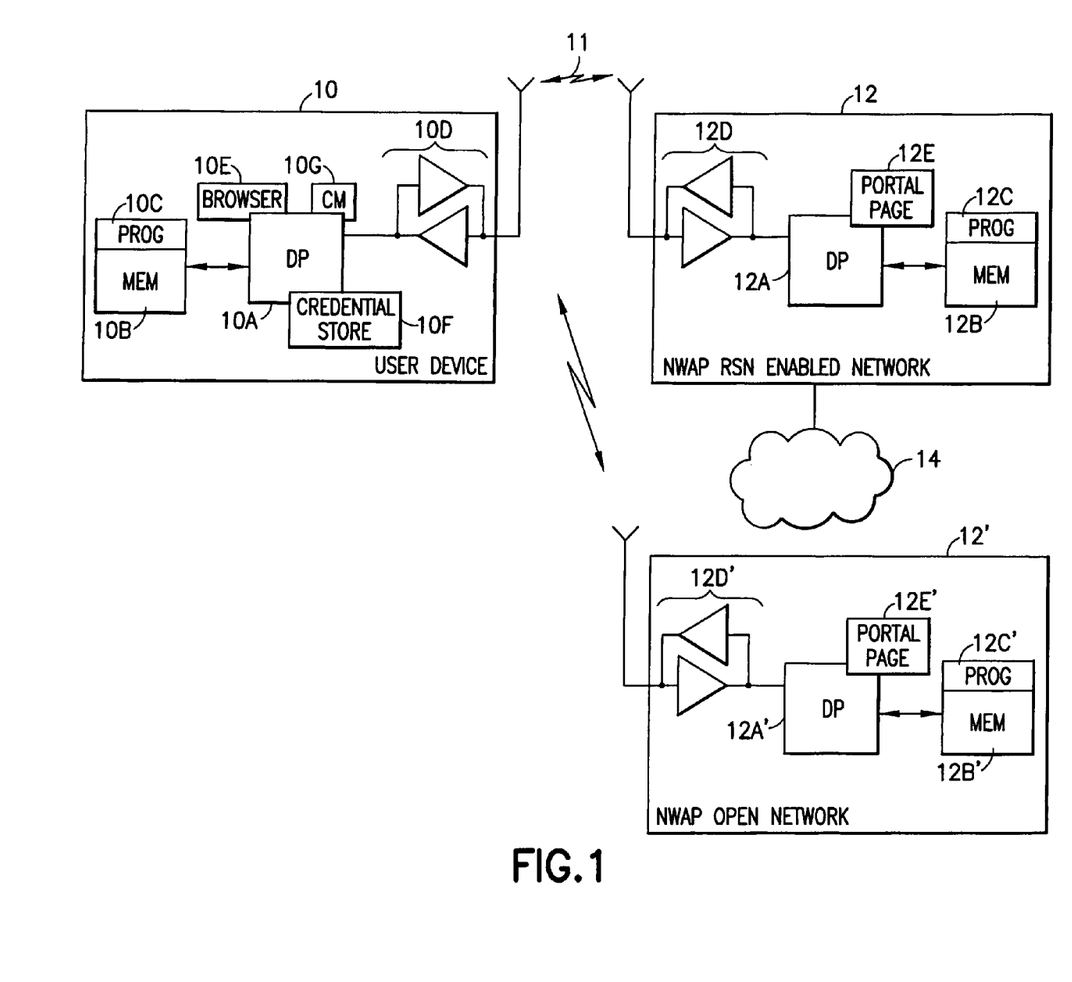
FIG. 1 shows a simplified block diagram of various electronic devices that are suitable for use in practicing the exemplary embodiments of this invention.

Before describing in further detail the exemplary embodiments of this invention, reference is made to FIG. 1 for illustrating a simplified block diagram of various electronic devices and apparatus that are suitable for use in practicing the exemplary embodiments of this invention. In FIG. 1 a Wi-Fi network is adapted for communication over a wireless link 11 with an apparatus, such as a mobile communication device which may be referred to herein as a station (STA) or as a user device (UD) 10, via a network access node or point. In FIG. 1 two network access points (NWAPs) are shown, where one represents an RSN-enabled network 12 and the other an open network 12' (a non-RSN-enabled network). At least the RSN-enabled NWAP (hotspot) 12 provides access to one or more data communications networks (e.g., the internet). The UD 10 includes a controller, such as at least one computer or a data processor (DP) 10A, at least one non-transitory computer-readable memory medium embodied as a memory (MEM) 10B that stores a program of computer instructions (PROG) 10C, and at least one suitable radio frequency (RF) transceiver (transmitter and receiver pair) 10D for bidirectional wireless communications with the network access nodes or points 12, 12' via one or more antennas. The NWAP 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver (transmitter and receiver pair) 12D for communication with the UD 10 via one or more antennas. The NWAP 12' may be assumed to be similarly constructed so as to include a controller, such as at least one computer or a data processor (DP) 12A', at least one computer-readable memory medium embodied as a memory (MEM) 12B' that stores a program of computer instructions (PROG) 12C', and at least one suitable RF transceiver (transmitter and receiver pair) 12D' for communication with the UD 10 via one or more antennas.

Note that while the RSN-enabled NWAP 12 and the open (non-RSN-enabled) NWAP 12' are shown as two separate access points, in practice the functionality of both could be co-located within one access point hardware/software system.

For the purposes of describing the exemplary embodiments of this invention the UD 10 may be assumed to also include a browser 10E, a credential store 10F and a connection manager (CM) 10G. While shown in FIG. 1 as separate elements, in practice the browser 10E and connection manager 10G can form a part of the program software 10C, and the credential store 10F can be implemented as a one or more storage locations in the memory 10B. The RSN-enabled NWAP 12 and the open (non-RSN-enabled) NWAP 12' may each include a portal page 12E, 12E', or otherwise have access to a server where a web portal page is hosted.

Note that the UD 10 can include a specialized WLAN integrated circuit or chip or module that embodies all or at least some of the functionality needed for WLAN connectivity and operations.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UD 10 and/or by the DP 12A of the NWAP 12, or by hardware, or by a combination of software and hardware (and firmware).

In general, the various embodiments of the UD 10 can include, but are not limited to, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, cellular telephones having Wi-Fi capability, as well as portable units or terminals that incorporate combinations of such functions.

The computer-readable MEMs 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

In accordance with the exemplary embodiments of this invention there are provided multiple solutions for on-line sign-up of the UD 10, as well as a simplified (seamless to the user) credential generation mechanism.

In a first embodiment (see also FIG. 2), for an occurrence of the RSN-enabled network 12 the corresponding non-RSN-enabled (i.e., open) network 12' is also provided. The open network 12' provides at least on-line sign-up capability for the UD 10, and typically would not provide access to the Internet or any other service.

Figure 2:
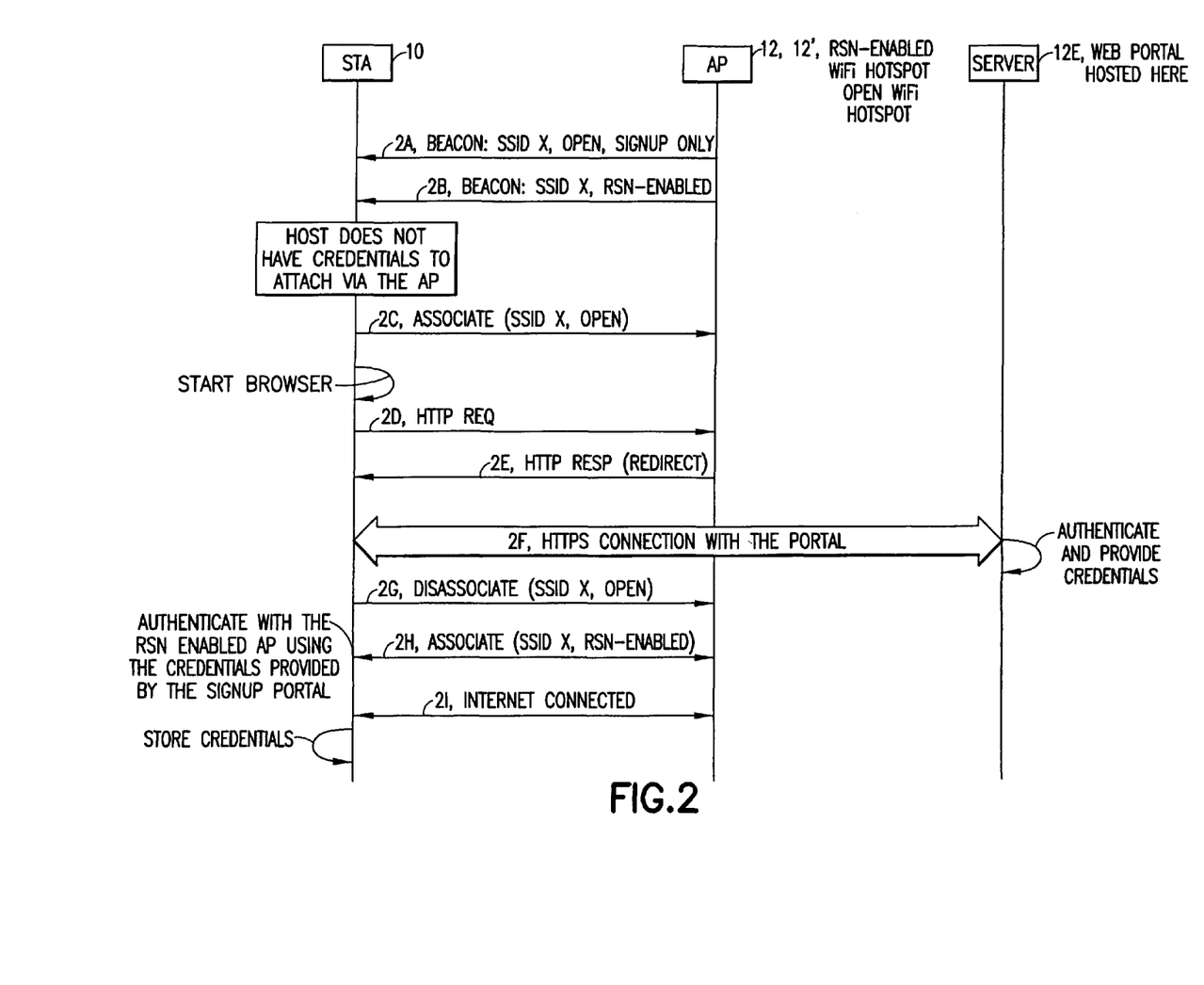
FIG. 2 is an interaction diagram between a station, an access point and a web portal server in accordance with a first embodiment of this invention.

The procedure operates as follows. The open network 12' advertises in its capabilities (e.g., a newly defined, or a vendor-specific capability) that it provides only an online sign-up service for credential creation to be used with the RSN network 12 (with the same SSID). As is well-known, the service set identifier, or SSID, is a name that identifies a particular 802.11 wireless LAN. A client device receives broadcast messages from all access points within range advertising their SSIDs. The client device can then either manually or automatically, based on configuration, select the network with which to associate. The SSID can be up to 32 characters long.

When the UD 10 performs a Network Discovery and Selection (NDS) procedure and finds both the open network 12' and the RSN-enabled network 12, with same SSID, it first checks if it has valid credentials with the RSN-enabled network 12. If the UD 10 determines that it does not have the proper RSN-enabled credentials it detects the capability of the open network 12' with the same SSID. If the capability of the network 12' indicates that it supports only the sign-up procedure, the UD 10 associates with the open network 12', launches the browser 10E and generates some (e.g. dummy) http traffic (e.g., by making a http request to some IP address such as dummyhomepage.net). The open network NWAP 12' redirects that http traffic to the portal page 12E (and offers its certificate to the UD 10 in a conventional manner). After the terminal authenticates the portal page using the provided credential, at the portal page 12E the UD 10 is offered the plan rates and asked to select one and enter charging (e.g.; credit card) information. The UD 10 may also be offered the possibility to create credentials for the user, or have the portal page 12E create the credentials (see below for credential creation).

When the browser 10E receives the credentials it may store them temporarily in the credential store 12F and initiate a disassociation message (e.g., by using the application program interfaces (APIs) of a WLAN chip available through a command line interface). The device UD 10 then initiates a connect message to the RSN-enabled network 12 by specifying the SSID to which credentials were just created (e.g., through the command line interface of the WLAN chip). Alternatively, if the SSID is not specified, the UD 10 can begin a new NDS procedure, find the SSID to which the credentials were created, and connect to it. When prompted for the credentials, the connection manager 10G in the UD 10 supplies the newly created credentials. After authentication succeeds, the connection manager 10G will consider the credentials verified and will update its status accordingly in the credential store 10F.

In the event that the credentials are not operable or valid, or they expire, the authentication will not succeed. Instead of providing an error message to the user, the UD 10 can instead automatically re-associate with the open NWAP 12' with the same SSID, generate http traffic in order to be redirected to the portal page 12E' which in turn displays what step(s) the user should take next (e.g., display a telephone number of a help desk) when it identifies that UD 10 (with its unique MAC address) tried to create credentials but was not successful for some reason.

Referring more specifically now to the exemplary interaction diagram of FIG. 2, at 2A a Beacon: SSID X, Open, Online Sign-up only is received from the open NWAP 12'. At 2B a Beacon: SSID X, RSN-enabled is received. Note that the order of reception of the beacons at 2A and 2B may be reversed in some situations. Since 2A indicates online sign-up only (meaning no access to the internet beyond the sign-up page/pages is provided), the UD10 continues to look for a network which provides access to the internet. In response to a determination that the host (UD 10) does not have credentials to attach via the RSN-Enabled AP, an Associate (SSID X, Open) is sent to the NWAP 12' for account creation purpose. The UD 10 starts the browser 10E, and at 2D sends a HTTP Req to the NWAP 12' (this is the dummy http traffic referred to above). At 2E the UD 10 receives in response a HTTP Resp (Redirect), and at 2F a HTTPS connection with the portal page 12E is established, whereby UD 10 authenticates the network and it is provided with the needed credentials once it supplies payment information. At 2F the UD 10 sends the Disassociate (SSID X, Open) to the NWAP 12'. At 2H the UD 10 sends an Associate (SSID X, RSN-enabled) and authenticates with the RSN-enabled NWAP 12 using the credentials provided by the web portal sign-up server 12E during the HTTPS connection 2F. Note in 2G and 2H that the SSID X is the same SSID received at 2A and 2B. At 2I the UD 10 becomes internet-connected beyond the sign-up page(s) via the RSN-enabled NWAP 12, and the credentials received during the HTTPS connection at 2F can be saved in the credential store 10F for later use.

In a second embodiment (see also FIG. 3), when there is an RSN-enabled network 12 for which the UD 10 does not have credentials, the UD 10 first checks the capability of the RSN-enabled network 12. If the capability for online-signup is supported (as currently defined in 802.11u, table 7-43bo), in accordance with an exemplary aspect of this invention the RSN-enabled network 12 provides a special sign-up Network Access Identifier (NAI, e.g., see RFC4282) in a pre-associated state. Such an NAI could be defined in 802.11u table 7-43bn, or it could be defined as an Access Network Query Protocol (ANQP) vendor-specific list element such that, when the online-signup capability is supported by the RSN-enabled network 12, the sign-up NAI must be provided. The UD 10 can then use, e.g., the ANQP (defined in 802.11u) with the, e.g., newly defined Info-name to request the sign-up NAI from the RSN-enabled network 12, while in the pre-associated state. When this sign-up NAI is received, the UD 10 uses this NAI as its Extensible Authentication Protocol (EAP) Identity during the 802.1x authentication procedure. When the RSN-enabled network 12 receives an EAP Response Identity message from the UD 10 with the sign-up NAI as the identity of the user, the RSN-enabled network 12 will know that the user desires to sign-up. In this case the authentication is server-side only, and the RSN-enabled network 12 should not ask for user credentials (this is the purpose of this to be defined sign-up NM, as the user does not have credentials). Once the UD 10 successfully authenticates the RSN-enabled network 12 and association is established (with 802.1x session keys generated), the UD 10 starts the browser 10E and generates some (e.g. dummy) http traffic. The RSN-enabled network 12 will redirect that http traffic to its portal page 12E. Note that even though link layer security is enabled, this embodiment assumes that the portal page 12 presents a certificate to the UD 10 and an https (http secure) connection is set up in order to prevent the RSN-enabled network 12 from seeing the credentials the user generates or it is provided with by the portal page. The user is then offered the plan rates and asked to select one and enter charging information. The user may also be offered the possibility to create credentials for the user or have the portal page 12 create the credentials (see below for credential creation). When the browser 10E receives the credentials it can store them temporarily in the credential store 10F, initiate the disassociation message, and then initiate a connect message to the same RSN-enabled network 12 by specifying the SSID to which the credentials were just created. When the RSN-enabled network 12 sends an EAP-Identity Request, the UD 10 supplies the identity just created (part of the set of credentials just created), and not the sign-up NAI.

Figure 3:
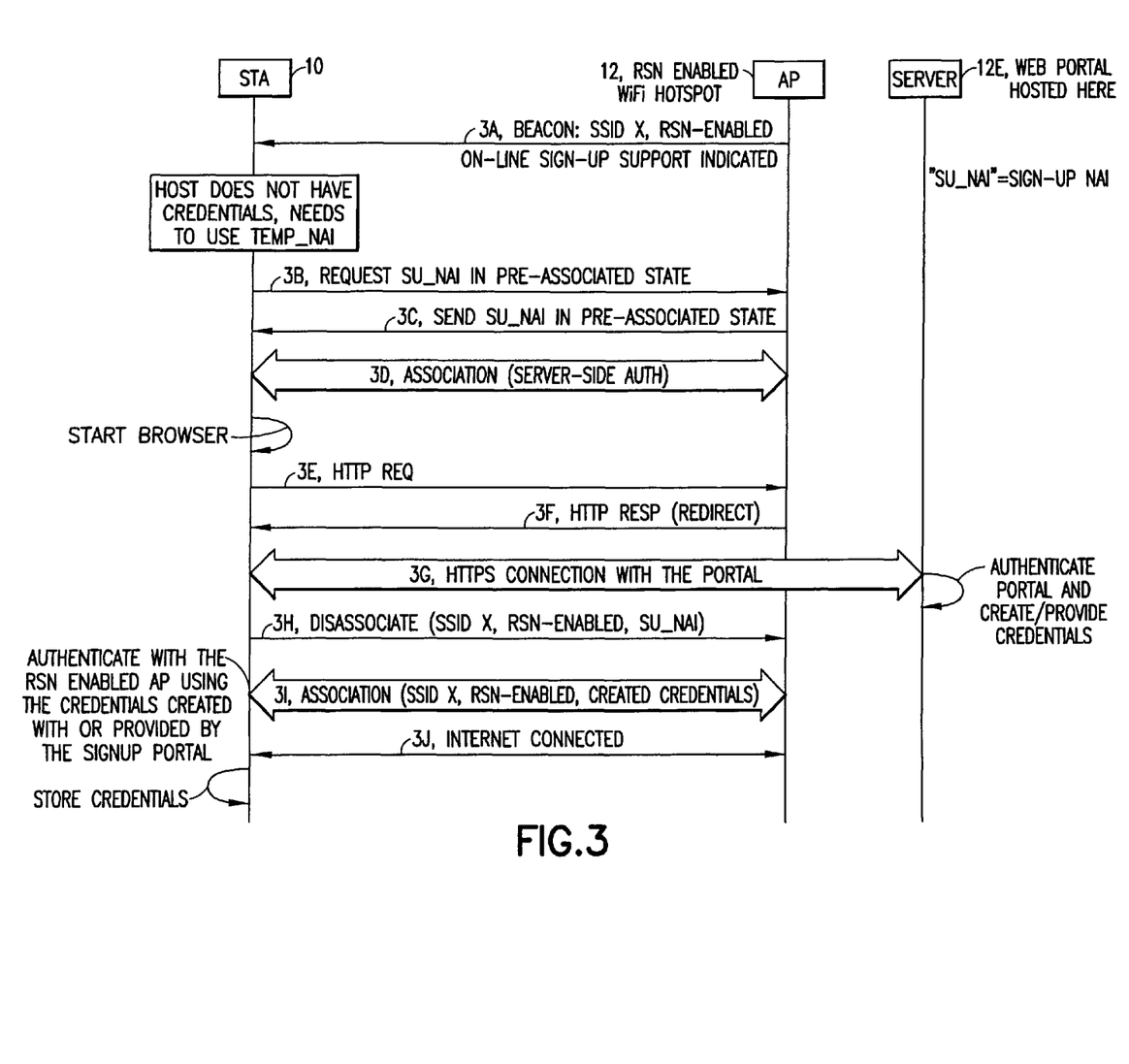
FIG. 3 is an interaction diagram between the station, the access point and the web portal server in accordance with a second embodiment of this invention.

Referring more specifically now to the exemplary interaction diagram of FIG. 3, at 3A the UD 10 receives from the RSN-enabled NWAP 12 a Beacon: SSID X, RSN-enabled, with on-line sign-up support being indicated. In the case where it is discovered that the host (UD 10) does not have the needed credentials, a determination is made to use the sign-up NAI. At 3B the UD 10 sends a Request in pre-associated state for the sign-up NAI, and at 3C receives the sign-up NAI (in the pre-associated state) from the RSN-enabled NWAP 12. At 3D the UD 10 and RSN-enabled NWAP 12 associate (using server side authentication only). The UD 10 then starts the browser 10E. At 3E the HTTP Req is sent (dummy HTTP traffic) and at 3F the NWAP 12 sends the HTTP Resp (redirect). At 3F the UD 10 receives in response a HTTP Resp (Redirect), and at 3G a HTTPS connection with the portal page 12E is established, whereby UD 10 authenticates the portal page and generates or it is provided with the needed credentials. At 3H the UD 10 sends the Disassociate (SSID X, RSN-Enabled, SU-NAI), and at 3I the UD 10 sends an Associate (SSID X, RSN-enabled) and authenticates with the RSN-enabled NWAP 12 using the credentials provided by the web portal sign-up server 12E during the HTTPS connection 3G. At 3J the UD 10 becomes internet-connected via the RSN-enabled NWAP 12, and the credentials received during the HTTPS connection at 3G can be saved in the credential store 10F for later use.

Described now is the credential creation procedure. There are two types of credentials that can be created online for "walk-up" users: username/password and certificate. These can either be permanent or time limited (e.g., a voucher). If they are permanent, there is most probably a credit line associated with the credential. When the credit line expires, the user will need to buy additional credit in order to use the credentials.

A client certificate is generated by software, but a username/password may be generated also by the user. There is, however, no reason to mandate that the user enter a username/password. The software could also generate random strings for both username/password, as in Hotspot 2.0 one of the requirements is that the UD 10 should not request the user to enter credentials. That is, these credentials are not for the user, but for device consumption.

Therefore, further in accordance with the exemplary embodiments when the user is redirected to a portal page (12, 12'), the portal page should have an option for the user to select either manual or automatic credential generation, with the default value being automatic credential generation (regardless of whether the network requires a username/password or a certificate as the credential). With automatic credential generation the portal page 12, 12' generates the required credentials (either a username/password or a client certificate) and provides the generated credentials to the UD 10. Once the UD 10 receives the credentials it stores them in the credential store 12F and uses them when appropriate. Since the UD 10 automatically supplies the credentials to the NWAP 12, 12' the user does not need to have knowledge of the credentials. Thus, the credentials do not need to be in a human readable form. Further, the user does not need to know the type of credentials that are received, (whether it is a username/password or a client certificate).

On the UD 10 side the implementation of the exemplary embodiments can be a part of the connection manager 10G client or daemon. When the UD 10 notices the availability of the RSN-enabled HS2.0 Wi-Fi hotspot network 12, and recognizes that it does not have credentials for use with that network, it can provide the logic and user interface enhancements which allow the user to purchase access on that network.

There are a number of advantages and technical effects that can be obtained by the use of the exemplary embodiments. For example, their use provides a method by which an end-user/consumer can purchase access to a HS2.0 RSN enabled Wi-Fi hotspot network. Further by example, the use of the exemplary embodiments satisfies a business interest of a Wi-Fi hotspot operator to provide the ability by which subscriptions can be purchased by anyone who is in the vicinity of that network. Further, the exemplary embodiments provide a secure means by which payment information and credentials are exchanged. In addition, the exemplary embodiments can be implemented by utilizing pre-existing protocols. These protocols are implemented in most UDs 10, and no enhancements to the protocols and/or connection manager 10G software are needed.

Based on the foregoing it should be apparent that the exemplary embodiments of this invention provide a method, apparatus and computer program(s) to enable connectivity with various types of local wireless communications types of devices and stations and terminals, such as those compliant with IEEE 802-types of communication systems.

Figure 4:
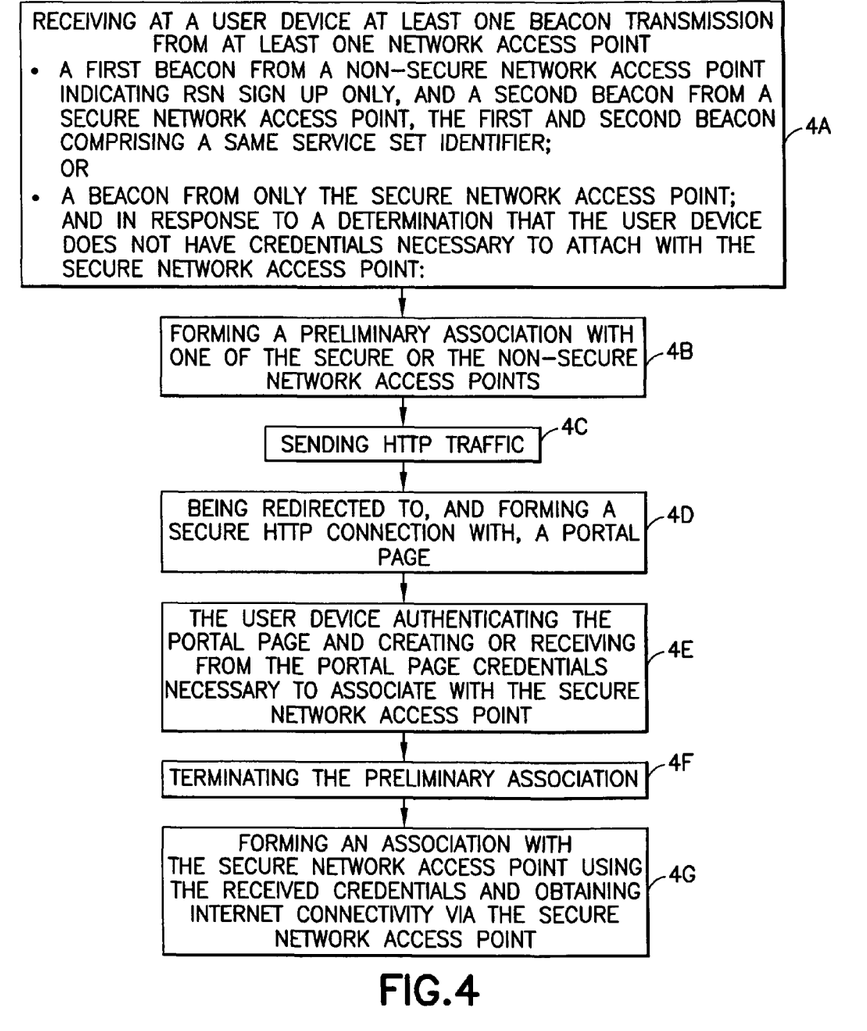
FIG. 4 is a logic flow diagram that illustrates from the perspective of a user device the operation of a method, and a result of execution of computer program instructions embodied on a computer readable memory, in accordance with the exemplary embodiments of this invention.

FIG. 4 is a logic flow diagram that illustrates from the perspective of the UD 10 the operation of a method, and a result of execution of computer program instructions, in accordance with the exemplary embodiments of this invention. In accordance with these exemplary embodiments a method performs, at Block 4A, a step of receiving at a user device at least one beacon transmission from at least one network access point. In one embodiment there is received a first beacon transmission from a non-secure network access point indicating RSN sign-up only and there is also received a second beacon from a secure access point, in which the first and second beacons comprise a same service set identifier. In another embodiment there is received only a beacon from the secure network access point. In response to a determination at block 4A that the user device does not have credentials necessary to attach with the secure network access point, at Block 4B a step of forming a preliminary association with one of the secure and the non-secure network access points according to the different embodiments above. By example, in one of those embodiments the UD 10 first gets a sign-up NAI from the RSN access point while in a pre-associated state with it before performing the preliminary association of block 4B with the RSN access point. At Block 4C there is a step of sending http traffic towards the access point associated at block 4B. As noted above, this http traffic can be dummy traffic or regular (genuine) traffic. At Block 4D there is a step of being redirected to, and forming a secure http connection with, a portal page. At Block 4E there is a step of the user device authenticating the portal page and receiving from the portal page credentials necessary to associate with the secure network access point. Alternatively the user device can create the credentials as also stated at block 4E. At Block 4F there is a step of terminating the preliminary association and, at Block 4G, there is a step of forming an association with the secure network access point using the received credentials and obtaining interne connectivity via the secure network access point.

The method as in FIG. 4, where the first beacon of block 4A is received from the non-secure access point which is a non-RSN enabled network access point that advertises only sign-up capability, and where the secure network access point is a different RSN enabled access point. In another embodiment the secure and non-secure network access points are embodied in the same physical node which operates functionally on a secure network and on a non-secure network, respectively.

The method of the preceding paragraph, where the user device forms the preliminary association at block 4B with the non-RSN enabled network access point, sends the (e.g., dummy) http traffic to the non-RSN enabled network access point, terminates the preliminary association with the non-RSN enabled access point, and forms the association with the RSN enabled access point using the received credentials.

The method as in FIG. 4, where the beacon is received from a robust security network (RSN) enabled network access point that provides the internet connectivity, the beacon indicating that the RSN enabled network access point supports a sign-up capability for the user device, and further comprising sending a request for a sign-up network access identifier (NAI), in a pre-associated state of the user device, to the RSN enabled network access point; receiving the requested sign-up NAI and, using server side authentication, associating with the RSN enabled access point.

The method of the preceding paragraph, where the user device sends the (e.g., dummy) http traffic to the RSN enabled network access point, terminates the preliminary association at block 4F that used the sign-up NAI with the RSN enabled access point, and forms the association with the RSN enabled network access point using the received credentials.

The method of FIG. 4 and any of the preceding paragraphs, where when connected with the portal page a user is enabled to select either manual or automatic credential generation.

The method of the preceding paragraph, where with automatic credential generation the portal page 12 generates the credentials as either a username/password or a client certificate and provides the generated credentials to the user device which stores and automatically provides the credentials to the RSN enabled network access point without requiring that the user be aware of the content of the credentials. Or in an embodiment the user can enter the generated credentials manually.

Figure 51:
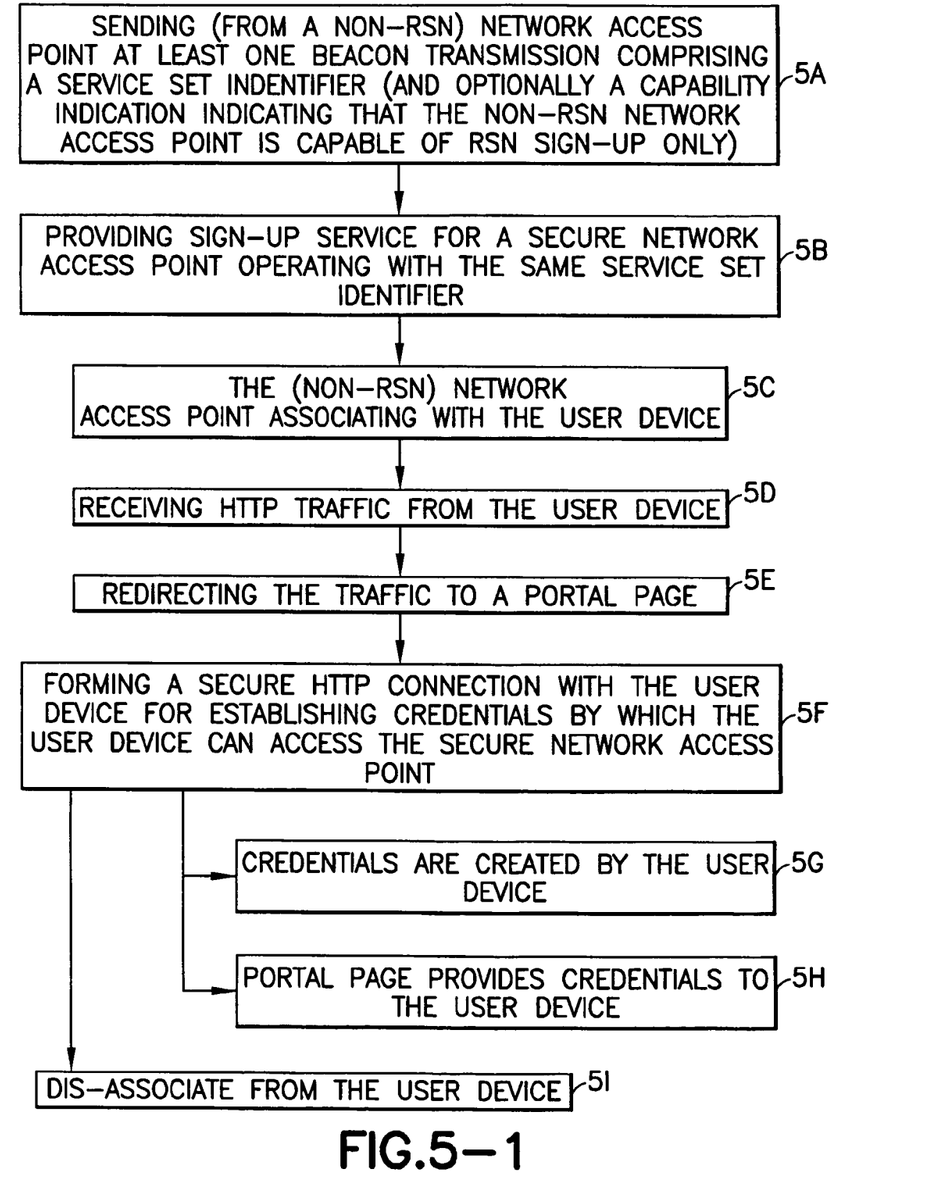

FIG. 5-1 is a logic flow diagram that illustrates from the perspective of the non-RSN AP 12' the operation of a method, and a result of execution of computer program instructions, in accordance with the exemplary embodiments of this invention. In accordance with these exemplary embodiments a method performs, at Block 5A, a step of sending from a (non-RSN) network access point at least one beacon transmission comprising a service set identifier, and at Block 5B the (non-RSN) network access point providing sign-up service for a secure network access point operating with the same service set identifier. In one embodiment the at least one beacon transmission also includes a capability indication indicating that the non-RSN network access point is capable of RSN sign-up only.

The sign-up may in an exemplary embodiment proceed as follows. At block 5C there is a step of the non-RSN access point associating with the user device such as by accepting an association request from the user device, and at block 5D there is a step of the non-RSN access point receiving http traffic from the user device. As above this http traffic can be dummy traffic or any traffic. At Block 5E there is a step of redirecting the traffic to a portal page, and for one specific embodiment at step 5F there is a step of forming a secure http connection with the user device for establishing credentials by which the user device can access the secure network access point. At Block 5G there is in one alternative a step of authenticating the user device with the portal page in which the user device creates the credentials. At Block 5H there is in another alternative a step of authenticating the user device with the portal page in which credentials necessary to associate with the secure (RSN) access point are sent from the portal page to the user device. There may be a preliminary association with the non-secure access point as noted above following the FIG. 4 description. And at block 5I there is a step of the non-RSN access point dis-associating from the user device.

Figure 52:
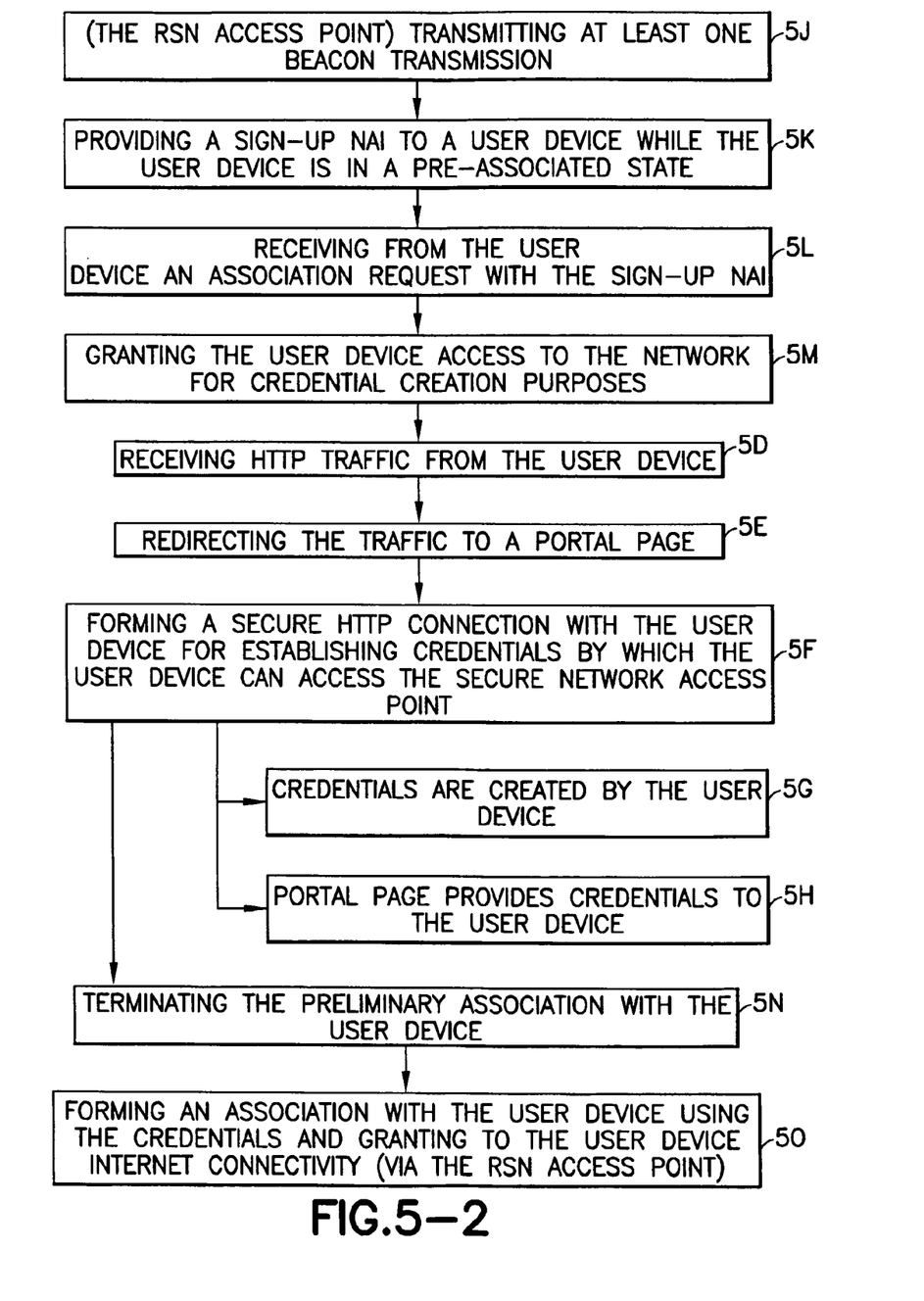

FIG. 5-2 is a logic flow diagram that illustrates from the perspective of the RSN AP 12 the operation of a method, and a result of execution of computer program instructions, in accordance with the exemplary embodiments of this invention. The RSN access node may be co-located with the non-RSN access node such as both being embodied in the same node but performing distinctly different functions. At Block 5J the RSN access node transmits at least one beacon transmission, and at block 5K in this particular embodiment there is the step of the RSN access point providing a sign-up NAI to the user device while the user device is in a pre-associated state with the RSN access point. At block 5L there is the step of receiving from the user device an association request which includes the sign-up NAI, and at block 5M there is a step of granting the user device (limited) access to the network for credential creation purposes. Blocks 5D through 5H of FIG. 5-2 are the same as described above for those same blocks of FIG. 5-1. Then the RSN access point terminates at block 5N the preliminary association that was granted at block 5M, and forms at block 5O an association with the user device using the credentials and grants to the user device interne connectivity via the RSN access point.

The exemplary embodiments also encompass a non-transitory computer-readable medium that contains software program instructions, where execution of the software program instructions by at least one data processor results in performance of operations that comprise execution of the method steps of FIGS. 4 and 5-1 and 5-2 and their related preceding several paragraphs.

The various blocks shown in FIGS. 4, 5-1 and 5-2 may thus be viewed as method steps, and/or as operations that result from operation of computer program code, and/or as a plurality of coupled logic circuit elements constructed to carry out the associated function(s).

The exemplary embodiments also pertain to an apparatus that comprises a processor and a memory including computer program code. The memory and computer program code are configured to, with the processor, cause the apparatus at least to receive at a user device at least one beacon transmission from at least one network access point, and in response to a determination that the user device does not have credentials necessary to attach with the network access point, to form a preliminary association with the network access point, to send (e.g., dummy) http traffic towards the network access point and in response to being redirected to, and forming a secure http connection with, a portal page, to authenticate the user device with the portal page and receive from the portal page credentials necessary to associate with the network access point. The memory and computer program code are further configured, with the processor, to terminate the preliminary association with the network access point and to form an association with the network access point using the received credentials so as to obtain internet connectivity via the network access point.

In general, the various exemplary embodiments may be implemented in hardware or special purpose circuits, software, logic, chip sets, e.g., a WLAN chip set or chip sets, or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the IEEE 802 type of systems, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., SSID, etc.) are not intended to be limiting in any respect, as these parameters may be identified by any suitable names. Further, the various names assigned to different network communications (e.g., HTTP, HTTPS, etc.) are not intended to be limiting in any respect, as these various communications may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

We claim:

1. An apparatus comprising:
   at least one processor; and
   at least one memory including computer program code;
   in which the at least one memory with the computer program code is configured with the at least one processor to cause the apparatus at least to:
   receive a beacon transmission from a secure network access point, where the beacon advertises a service set identifier (SSID);
   in response to determining that the apparatus does not have credentials necessary to attach with the secure network access point, form a preliminary association with the secure network access point using the advertised SSID;
   during the preliminary association, receive or create credentials necessary to associate with the secure network access point; and
   form an association with the secure network access point using the received or created credentials and the advertised SSID, and obtain interne connectivity via the secure network access point.

2. The apparatus according to claim 1, in which the at least one memory with the computer program code is configured with the at least one processor to further cause the apparatus at least to:
   send http traffic towards the secure network access point during the preliminary association; and
   form a secure http connection with a portal page to which the apparatus is redirected in response to sending the http traffic;
   in which the apparatus is configured to receive or create the credentials necessary to form the association with the secure network access point while in the secure http connection with the portal page.

3. The apparatus according to claim 2, where when connected with the portal page a user is enabled to select via the apparatus either manual or automatic credential generation.

4. The apparatus according to claim 3, where with the automatic credential generation the apparatus receives from the portal page the generated credentials which comprise one of a username, a password and a client certificate; the apparatus is configured to store the received credentials in the at least one memory, and the apparatus is configured to automatically provide the stored credentials to the secure network access point without requiring that the user be aware of content of the credentials.

5. The apparatus according to claim 1, in which the beacon received from the secure network access point indicates that the secure network access point supports on-line sign-up.

6. The apparatus according to claim 1, in which the at least one memory with the computer program code is configured with the at least one processor to further cause the apparatus at least to:
   while the apparatus is in a pre-associated state, send a request for a sign-up network access identifier NAI to the secure network access point;
   receive the requested sign-up network access identifier; and thereafter
   form the preliminary association with the secure network access point using the network access identifier and only server side authentication.

7. A method comprising:
   receiving at a user device a beacon transmission from a secure network access point, where the beacon transmission advertises a service set identifier (SSID);
   in response to determining that the user device does not have credentials necessary to attach with the secure network access point, forming a preliminary association between the user device and the secure network access point using the advertised SSID;
   during the preliminary association, the user device receiving or creating credentials necessary to associate with the secure network access point; and
   forming an association between the user device and the secure network access point using the received or created credentials and the advertised SSID, and obtaining internet connectivity for the user device via the secure network access point.

8. The method according to claim 7, the method further comprising:
   sending http traffic towards the secure network access point during the preliminary association; and
   forming a secure http connection with a portal page to which the user device is redirected in response to sending the http traffic;
   in which the user device receives or creates the credentials necessary to associate with the secure network access point while in the secure http connection with the portal page.

9. The method according to claim 7, in which the received beacon transmission indicates that the secure network access point supports on-line sign-up.

10. The method according to claim 9, the method further comprising:
    while the user device is in a pre-associated state, sending a request for a sign-up network access identifier NAI to the secure network access point;
    receiving the requested sign-up network access identifier; and thereafter
    forming the preliminary association with the secure network access point using the network access identifier and only server side authentication.

11. A non-transitory computer-readable medium that includes computer program instructions which when executed by at least one data processor result in performance of operations comprising:
    receiving at a user device a beacon transmission from a secure network access point, where the beacon transmission advertises a service set identifier (SSID);
    in response to determining that the user device does not have credentials necessary to attach with the secure network access point, forming a preliminary association with the secure network access point using the advertised SSID;
    during the preliminary association, the user device receiving or creating credentials necessary to associate with the secure network access point; and
    forming an association between the user device and the secure network access point using the received or created credentials and the advertised SSID, and obtaining internet connectivity via the secure network access point.

12. The non-transitory computer-readable medium of claim 11, in which the operations further comprise:
sending http traffic towards the secure network access point during the preliminary association; and
forming a secure http connection with a portal page to which the user device is redirected in response to sending the http traffic;
in which the user device receives or creates the credentials necessary to associate with the secure network access point while in the secure http connection with the portal page.

13. An apparatus comprising:
at least one processor; and
at least one memory including computer program code;
in which the at least one memory with the computer program code is configured with the at least one processor to cause the apparatus at least to:
transmit at least one beacon transmission, where the beacon transmission advertises a service set identifier (SSID);
provide a sign-up network access identifier NM to a user device while the user device is in a pre-associated state with the apparatus using the advertised SSID;
receive from the user device an association request which includes the sign-up network access identifier NAI;
grant the user device limited access to a network for credential creation purposes; and
using created credentials, grant the user device Internet connectivity using the advertised SSID.

14. The apparatus according to claim 13, in which granting the user device limited access to the network for credential creation purposes comprises:
establishing a preliminary association with the user device;
redirecting http traffic received from the user device during the preliminary association to a portal page;
forming a secure http connection with the user device for establishing the credentials; and
terminating the preliminary association with the user device.

15. The apparatus according to claim 13, in which the apparatus comprises a robust security network RSN network access point, and the at least one memory with the computer program code is configured with the at least one processor to further cause the apparatus at least to:
form an association with the user device using the credentials and thereafter grant the user device Internet connectivity via the apparatus.

16. A method comprising:
transmitting at least one beacon transmission, where the beacon transmission advertises a service set identifier (SSID);
providing a sign-up network access identifier NAI to a user device while the user device is in a pre-associated state using the advertised SSID;
receiving from the user device an association request which includes the sign-up network access identifier NAI;
granting the user device limited access to a network for credential creation purposes; and
using created credentials, grant the user device Internet connectivity using the advertised SSID.

17. The method according to claim 16, in which granting the user device limited access to the network for credential creation purposes comprises:
establishing a preliminary association with the user device;
redirecting http traffic received from the user device during the preliminary association to a portal page;
forming a secure http connection with the user device for establishing the credentials; and
terminating the preliminary association with the user device.

18. The method according to claim 16, in which the method is executed by a robust security network RSN network access point, and the method further comprises:
forming an association with the user device using the credentials and thereafter granting the user device Internet connectivity via the robust security network RSN network access point.

19. A non-transitory computer-readable medium that includes computer program instructions which when executed by at least one data processor result in performance of operations comprising:
transmitting at least one beacon transmission, where the beacon transmission advertises a service set identifier (SSID);
providing a sign-up network access identifier NAI to a user device while the user device is in a pre-associated state using the advertised SSID;
receiving from the user device an association request which includes the sign-up network access identifier NAI; and
granting the user device limited access to a network for credential creation purposes; and
using created credentials, grant the user device Internet connectivity using the advertised SSID.

20. The non-transitory computer-readable medium of claim 19, in which the operations further comprise:
establishing a preliminary association with the user device;
redirecting http traffic received from the user device during the preliminary association to a portal page;
forming a secure http connection with the user device for establishing the credentials; and
terminating the preliminary association with the user device.

* * * * *

UNITED STATES PATENT AND TRADEMARK OFFICE
CERTIFICATE OF CORRECTION

| | | |
|---|---|---|
| PATENT NO. | : 9,131,373 B2 | Page 1 of 1 |
| APPLICATION NO. | : 13/234906 | |
| DATED | : September 8, 2015 | |
| INVENTOR(S) | : Patil et al. | |

It is certified that error appears in the above-identified patent and that said Letters Patent is hereby corrected as shown below:

In the claims

Claim 1, col. 13, line 31 delete "interne" and insert --internet--.

Claim 13, col. 15, line 20 delete "NM" and insert --NAI--.

Signed and Sealed this
Fifteenth Day of December, 2015

Michelle K. Lee
*Director of the United States Patent and Trademark Office*